March 26, 1957     J. P. HEISS     2,786,456
THERMOSTATIC FAN
Filed Nov 19, 1954     2 Sheets-Sheet 1
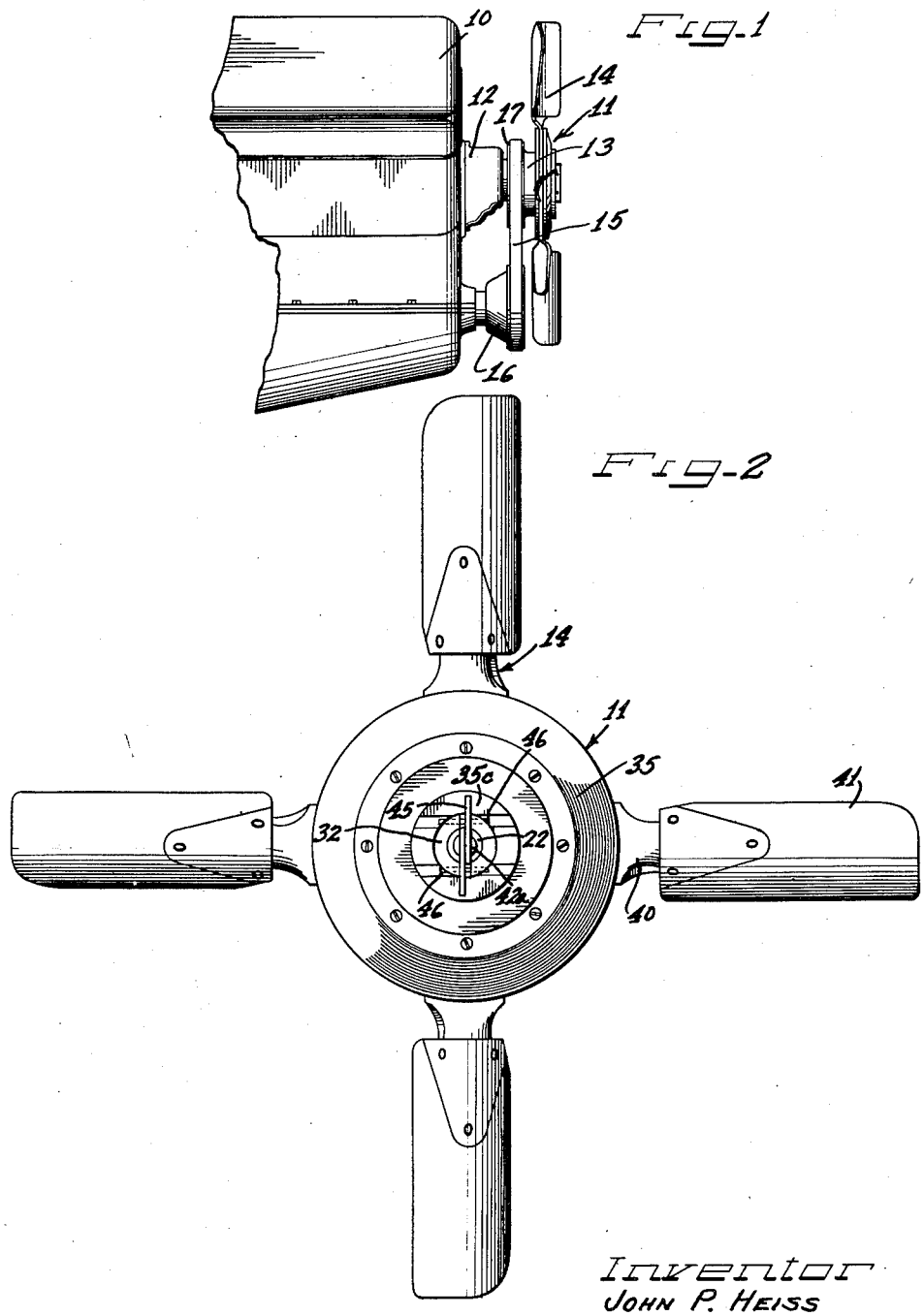
Inventor
JOHN P. HEISS

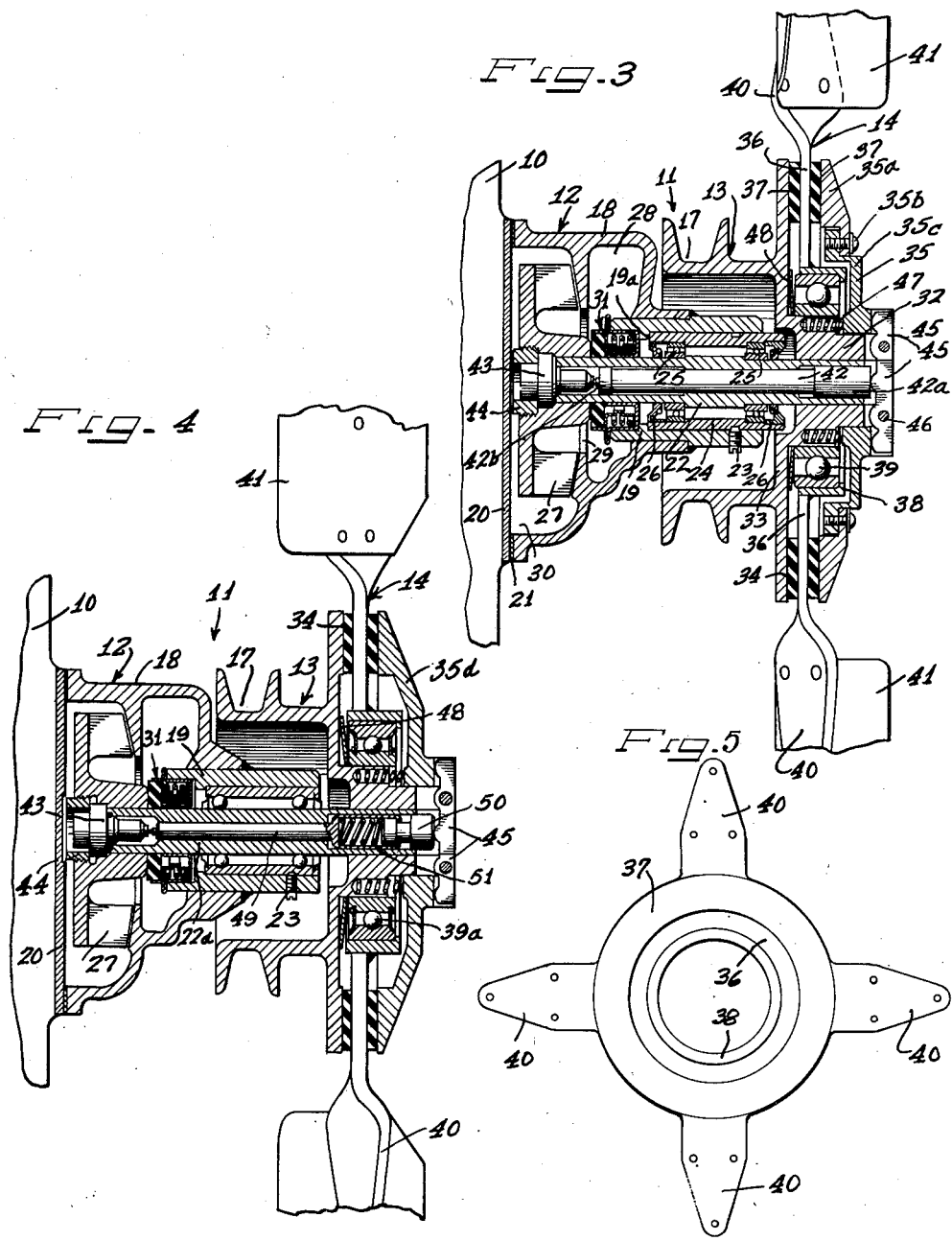

United States Patent Office 2,786,456
Patented Mar. 26, 1957

2,786,456

THERMOSTATIC FAN

John P. Heiss, Flint, Mich., assignor to Thompson Products, Inc., Cleveland, Ohio, a corporation of Ohio Application November 19, 1954, Serial No. 469,881

12 Claims. (Cl. 123—41.12)

This invention relates to improvements in fan drives, and more particularly to thermostatically controlled drives for cooling fans of internal combustion engines or the like, although the invention may have other uses and purposes as will be apparent to one skilled in the art.

More specifically, the invention includes the provision of a clutch bearing pulley assembly supported on a hollow water pump shaft, a cooling fan normally freely rotatable on said pulley assembly, and a thermostatically controlled plunger within said hollow shaft actuating the clutch bearing pulley assembly to engage and disengage it with the cooling fan according to the engine operating temperature.

In the past, numerous devices have been developed to disconnect the drive to the cooling fans of internal combustion engines when the engine temperature is low. However, these devices included fan drives of highly complicated structure involving prohibitive manufacturing costs, poor efficiency, and high maintenance costs. For this reason, the manufactures of internal combustion engines refused to adapt the usage of fan drives, since it was obvious that the economy in operation of the internal combustion engine using such a fan drive unit would be more than offset by the cost of the unit itself.

Accordingly, it is an object of this invention to overcome the heretofore encountered difficulties set forth in the preceding paragraph, and provide a fan drive unit of simple and economical construction which may be readily adapted for cooling usage on an internal combustion engine or other apparatus already equipped with a liquid cooling system.

It is a further object of this invention to provide a fan drive adapted to drive a cooling fan for internal combustion engines or the like only when the temperature of the engine exceeds a predetermined point.

Another object of this invention lies in the provision of a fan drive unit for internal combustion engines or the like having a minimum number of parts including a thermostatically controlled plunger which actuates a clutch mechanism for connecting or disconnecting a cooling fan to a continuously operating pulley assembly.

Still another object of this invention is the provision of a simple and positively acting thermostatically operated cooling fan driving unit for connecting the cooling fan to a drive means when the engine is at a predetermined temperature.

Another feature of the invention is to provide a fan drive for internal combustion engines or the like with a plunger actuated clutch mechanism, and a positively acting thermostat actuating said plunger, wherein a spring biased end of the plunger compensates for overtravel of the thermostat caused by extreme overheating of the engine thereby avoiding any possible damage to the fan drive unit.

Still another feature of this invention is the provision of a fan drive unit having a thermostatically controlled clutching mechanism which positively connects a cooling fan to a continuously driven pulley assembly, and wherein means are provided for positively disengaging the clutch and cooling fan.

Other objects, features and advantages of this invention will be apparent from the following detailed description of the annexed sheets of drawings, which, by way of preferred examples, illustrate two embodiments of the invention:

Figure 1 is a fragmentary side elevational view of an engine equipped with a fan drive unit embodying the present invention;

Figure 2 is an enlarged front elevational view of a fan drive unit according to the invention;

Figure 3 is an enlarged axial section, in elevation, taken substantially along a central vertical plane of the embodiment of Figure 2;

Figure 4 is an enlarged sectional view taken through a modified form of the invention; and Figure 5 is a front elevational view of a cooling fan using the present invention, with some parts omitted.

As shown in the drawings:

As shown in Figure 1, the fan drive unit of the present invention is installed on a fluid or water cooled internal combustion engine indicated at 10. The fan drive unit generally indicated by the numeral 11, comprises a water pump 12, a pulley assembly 13, and a cooling fan 14. The cooling fan 14 is rotatably supported to draw air through the conventional radiator and over the engine to cool the engine, and may be driven by the pulley assembly 13, the latter being continuously driven by a belt 15 trained over a drive pulley 16, said drive pulley being mounted on an extension of the engine crankshaft projecting from the front of the engine, and a belt groove 17 of the pulley assembly 13.

Referring now to Figures 2 and 3, the water pump 12 comprises a pump housing 18 rigidly secured to the engine 10 by suitable fastening means, a cylindrical bushing 19 extending partially within the housing 18 and rigidly fastened thereto by brazing, welding or other equivalent means, and a pump cover 20 interposed between the pump housing 18 and the engine 10. A gasket with suitable sealing characteristics is interposed between the pump cover 20 and the pump housing 18 as indicated by the numeral 21.

As shown in Figure 3, a bearing assembly for supporting a hollow pump shaft 22 is removably secured within the bushing 19 by a set screw 23. The bearing assembly comprises an outer cylindrical member 24 fitting within the bushing 19 against an annular shoulder 19a, ball bearings 25, 25 having outer races press fitted or fastened by other suitable means to the cylindrical casing 24 and inner races press fitted or suitably fastened to the hollow pump shaft 22, and end oil sealing and retaining means 26, 26. This bearing assembly is hermetically sealed, and may be preferably termed as an oil sealed bearing of the type well known in the art which never needs any lubrication attention.

Thus, it is seen that the hollow pump shaft 22 is supported for rotation by the sealed bearing arrangement within the bushing 19 in such a way that axial movement of the shaft relative to the pump housing 18 is precluded.

A pump impeller 27 is press fitted or suitably fastened to the inner end of the pump shaft 22 to be driven thereby. The fluid or water cooled by the radiator will enter the inlet chamber 28 of the pump housing, pass rearwardly through an annular opening 29 of an intermediate wall to be forced from the tips of the impeller blades in the impeller chamber 30, through suitable apertures or openings (not shown) in the pump cover 20 to the engine block for cooling thereof.

Provided at the inner end of the bushing 19 within the pump housing 18 is a water seal 31 preventing any fluid or water from escaping the pump housing 18 and possibly damaging other parts of the unit, such as the bearing arrangement for the hollow shaft 22. The fluid or water seal 31 comprises a metal annulus fitted snugly within the inner end of the bushing 19 and around the pump shaft 22, a lateral flange abutting against the inner end of the bushing 19, a resilient sealing ring, preferably made of rubber, having its periphery contained within a cylindrical portion of the annulus and its opposite faces abutting tightly against or in close contact with the hub portion of the impeller 27 and a shoulder of the metal annulus, and a spring member within said metal annulus constantly urging the shoulder thereof against one face of the rubber ring in sealing engagement with the hub of the impeller 27 and the inner cylindrical portion of the metal annulus.

Removably secured against axial movement such as by keying or other equivalent means, to the front or outer end of the pump shaft 22 for rotation therewith is a hub 32 of the pulley assembly 13. As already discussed, an enlarged cylindrical portion of the pulley assembly 13 carries a sheave or belt groove 17 which is operatively connected to be driven by the crankshaft of the engine. An inwardly extending flange 33 connects the cylindrical sheave portion and the hub 32 as a unitary member. An extension of the connecting flange 33 continues outwardly and forms a disk-shaped clutch plate 34.

Axially slidable along a reduced portion of the hub 32 is a two-piece clutch plate unit 35 having an outer clutch face 35a rigidly secured as by studs 35b to the inner centrally apertured plate 35c. Alternatively, the movable clutch plate may be of one-piece construction, as indicated at 35d in Figure 3. The clutch plate 35 may be splined or appropriately keyed with the reduced portion of the hub 32 to rotate therewith, but to slide axially thereon.

A disk portion 36 of the cooling fan 14 has bonded or suitably fastened thereto on its opposite faces, disks 37, 37 of suitable friction material between the clutch plates 34 and 35 to be engaged thereby. Alternatively the disks may be bonded to the clutch plates. Centrally carried by the disk portion 36 of the cooling fan 14 is a bearing receiving member 38 within which may be suitably fastened, such as by a press fit, a bearing 39 of such size as to surround the hub 32 of the pulley assembly 13, but having enough clearance to be axially slidable thereover. Alternatively, the bearing 39 may take the form of a sealed bearing, as shown in Figure 4, and indicated by the numeral 39a, wherein the bearing may be oil sealed against dust and other undesirable elements capable of withstanding substantially unlimited usage without the need of lubrication. The disk portion 36 of the cooling fan 14 carries at its outer periphery four circumferentially spaced blade holding elements 40 desirably pitched to hold the blades 41 at a suitable angle. The blades 41 may be rigidly secured to the blade holding elements 40 such as by riveting or other suitable means.

Still referring to Figure 3, a plunger or push rod 42 is slidably disposed within the hollow pump shaft 22. The plunger carries an intermediate portion sized to closely fit with an intermediate portion of the pump shaft 22 for slidable engagement therewith and for maintaining the plunger in proper axial alignment with the shaft. Enlarged portions 42a and 42b carried at the front and rear end of the plunger 42, respectively, coact with suitably enlarged diametral portions of the hollow shaft 22, and function as the actuating end and the actuated end of said plunger.

A thermostatic element 43, commonly called a vernatherm as will be hereinafter explained, carries an enlarged annular portion abutting against the rear end of the hollow hub shaft 22 and recessed within the impeller 27, and rigidly held in place by an open ended plug 44 threadedly engaging the impeller 27 and contacting the enlarged portion of the vernatherm 43. The open ended plug 44 allows cooling fluid to circulate in and around the rear end of the vernatherm to transfer the temperature of the fluid directly to the vernatherm unit 43.

The thermostatic element 43 is of the same general type as shown and described in the Vernet Patent No. 2,368,181, dated January 30, 1945, and is commonly known as a "Vernay" thermostatic element or a vernatherm. The front end of the vernatherm carries a reduced cylindrical casing which is received within the rear end of the hollow shaft 22, and within the casing a piston or plunger is carried in actuating contact with the rear enlarged portion 42b of the plunger 42. The particular utility of this type of thermostatic element is the positive action of the piston having far more power than any other thermostatic element and a relatively long piston travel, together with the compact overall size of the element in comparison with other known thermostatic units. Since the vernatherm is such a positive acting and powerful type of a thermostatic unit, it is particularly desirable for use in conjunction with the present invention, although other thermostatic units may be used. The thermostatic element 43 also includes in the rear casing, a thermally expansible material of a type such as shown in and described in Patent No. 2,259,846 which issued to Sergius Vernet on October 21, 1941. The thermally expansible material is contained within the rear casing where the thermostatic element acts against a membrane or deformable member (not shown) as it expands to extend the piston of the vernatherm upon predetermined rises in temperature and thereby axially move forwardly the plunger 42.

Upon forward movement of the plunger 42, the forward enlarged end 42a contacts one end of fingers 45, 45 which are pivotally supported on cross pins 46, 46 recessed within slots of the hub member 32 of the pulley assembly 13. The outer rounded end portions of the fingers 45 contact, within a slotted portion of plate 35c, the slidable clutch plate 35 at substantially diametrically opposite points. If desired, the fingers 45 alone in their unique mounting may be used to prevent relative rotational movement between the movable clutch plate 35 and the hub 32.

In normal operation, where the fluid cooling system of the engine sufficiently handles the heat generated thereby and maintains the engine at a predetermined operating temperature, the cooling fan 14, not being engaged by the clutch plates, would remain substantially stationary relative to the rotational movement of the pulley assembly 13. When, however, the temperature of the fluid cooling system rises above a predetermined point thereby causing actuation of the vernatherm or thermostatic unit 43, the piston of the thermostatic unit extends axially along the hollow pump shaft 22 pushing or urging the plunger 42 outwardly against the fingers 45. Due to the force urged against the inner ends of the fingers 45, the lower finger will pivot clockwise around its pivot pin 46 while the upper member will pivot counterclockwise around its pin member 46, thereby transferring the axial force of the plunger 42 to the very ends of the fingers 45 which then urges the clutch plate 35 inwardly axially along the reduced portion of the hub 32 against a force exerted by an annular series of return springs 47. The clutch plate face 35a of clutch plate 35 then contacts the outer friction disk 37 of the cooling fan 14. Immediately, the cooling fan 14 will rotate at a partial speed of the pulley assembly 13, but then will be axially moved against the force of the spring washer 48, commonly known as a Bellville washer. Upon the continued urging of the plunger 42 the cooling fan will collapse the Bellville washer thereby allowing the inner friction disk 37 to engage the inner clutch plate 34 thereby driving the cooling fan 14 at the same speed as the pulley assembly 13. In other words, the pulley assembly 13 and the cooling fan 14, when the temperature of the engine is below the predetermined point of the vernatherm 43, function independent of one another. But when the vernatherm 43 is actuated by a rise in engine temperature the pulley assembly 13 and the cooling fan 14 effectively become a single unit operating and functioning together. During the time the cooling fan is connected to the pulley assembly, the fan will draw air through the radiator and over the engine aiding in the cooling thereof. Upon retraction of the plunger 52 when the temperature of the engine allows the thermostat to return to its normal position, the movement of the parts generally reverse, wherein the springs 47 return the clutch blade 35 to its non-operating position and the Bellville or spring washer 48 urges the cooling fan disk away from the inner clutch plate face 34.

Figure 4 illustrates a modified form of the invention, wherein as already explained bearing 39a is of a sealed type rather than being open like the fan bearing 39 of Figure 3; and the pump shaft 22a is supported by a slightly different type of a bearing in the bushing 19. In Figure 4, parts identical with parts already described have been marked with the same reference numeral. This bearing arrangement carries an outer cylindrical race snugly fitted within the bushing 19 and held there by a set screw 23, and between the outer bearing race and the shaft a plurality of rows of balls are axially spaced providing an anti-friction engagement. At each end of the bearing sealing members fit around the hollow shaft 22a and prevent dust or other elements from entering the interior of the bearing and causing failure thereof. Again this bearing may be of the type which will last more or less for the life of the fan unit without the need of lubrication or oiling.

The major difference in this embodiment lies in the provision of a safety-type actuating plunger 49, which carries at its forward end a spool or end member 50 resiliently biased by a spring member 51 in a forward direction at all times. An intermediate portion of the spool 50 is diametrically reduced to be retianed within a hollow cylindrical portion of the plunger which also carries an inwardly extending flange preventing the spool 50 from leaving the limited confines of the plunger 49. The spring 51 is tensioned so as to provide the normal movement of the plunger head 50 during the normal operation of the thermostatic unit 43. However, if the engine overheated, thereby causing the thermostatic unit to further expand and urge its piston to continue the movement of the plunger 49 forwardly, the spring 51 will then collapse against this added pressure or force and prevent injury to any of the parts such as the vernatherm casing. The overtravel spring 51 also protects the possible fracturing of the fingers 45, 45 and serves as a positive return device for the plunger 49 and the vernatherm piston. Thus, it will be understood that the embodiment illustrated in Figure 4 containing the resiliently extensible plunger provides an added safety device guarding against overheating and the powerful action of the vernatherm unit 43. Otherwise, the operation of this embodiment is like that described in connection with the first embodiment.

It will be understood that modifications and variations may be effected without departing from the scope of the novel concepts of the present invention.

I claim as my invention:

1. A cooling fan drive for an internal combustion engine or the like having a coolant pump which comprises a driven pulley carrying a stub shaft and a first clutch plate integral therewith, a fan journaled on said shaft capable of sliding axially thereof and engaging said clutch plate, a second clutch plate carried by said shaft for coacting with said first clutch plate to connect said fan to said shaft, a thermostat in said pump and a plunger actuated by said thermostat for controlling said connection between the fan and shaft and the rotation of said fan.

2. In a fan drive for internal combustion engines or the like having a coolant pump, a pulley mounted on a hollow rotatable shaft, clutch members carried by said pulley, a fan normally free to rotate about a reduced journal portion of said pulley, a plunger slidably mounted for axial movement within said shaft, said plunger movement responsive to a thermostat in said pump, and means for connecting said plunger to a clutch member, whereby said thermostat will control the engagement and disengagement of the clutch with the fan.

3. In a fan drive for internal combustion engines or the like, a hollow shaft journaled in a water pump housing, a portion of which projects out of said housing, a water pump mounted on the inner end of said shaft for rotation therewith, a pulley carried by the projecting portion of said shaft for rotation therewith, a clutch plate carried by said pulley and being stationarily mounted thereto, an axially movable clutch plate carried by said pulley, a fan normally freely rotatably supported by a reduced journal portion of said pulley, a thermostat adjacent the inner end of said shaft, a plunger within said shaft slidable axially in response to said thermostat, and fingers pivotally secured to said reduced portion of said pulley, the opposite free ends of said fingers contacting said plunger and said movable clutch plate, whereby movement of said movable clutch plate by said thermostat operatively connects said pulley and said fan.

4. In a fan drive for an internal combustion engine, a hollow shaft carrying a water pump impeller on the inner end thereof and a pulley assembly on the outer end, a hub portion on said assembly, a fan freely rotatable on said hub portion, said shaft intermediately supported by a bearing arrangement, a clutch plate integral with said assembly, an axially movable clutch plate on said hub portion of said assembly coacting with said integral clutch plate to selectively engage said fan for rotation with said assembly, and means responsive to the engine temperature for actuating said movable clutch plate, said means comprising a thermostatically actuated plunger axially movable within said hollow shaft and operatively connected to said movable clutch plate, said plunger having a yieldable portion adapted to compensate for possible overtravel of said plunger.

5. In a cooling fan drive for an internal combustion engine having a liquid cooling system and a coolant pump, a hollow shaft carrying a plunger therein, a thermostat associated with the liquid cooling system in said pump responsive to temperature changes, said thermostat capable of axially displacing said plunger along said shaft, a pulley constantly driven while the engine is in operation secured to said shaft, a cooling fan supported by said pulley and normally freely rotatable thereon, and means actuated by said plunger uniting the pulley and fan for concurrent rotation.

6. In a cooling fan drive for an internal combustion engine having a liquid cooling system and a coolant pump, a hollow shaft carrying a plunger therein, a thermostat associated with the liquid cooling system in said pump responsive to temperature changes, said thermostat capable of axially displacing said plunger along said shaft, a one-piece pulley assembly secured to said shaft constantly driven while the engine is in operation, said assembly including a disc portion, a pulley and an axially extending cylindrical hub section, said disc portion functioning as a clutch plate and abutment member, an axially slidable clutch plate on said hub adapted to be actuated by said plunger, and a fan secured to a bearing which is axially slidable on said hub section between said disc portion and said slidable clutch plate.

7. In a cooling fan drive for an internal combustion engine having a liquid cooling system and a coolant pump, a hollow shaft carrying a plunger therein, a thermostat associated with the liquid cooling system in said pump responsive to temperature changes, said thermostat capable of axially displacing said plunger along said shaft, a one-piece pulley assembly secured to said shaft constantly driven while the engine is in operation, said assembly including a disc portion, a pulley and an axially extending cylindrical hub section, said disc portion functioning as a clutch plate and abutment member, an axially slidable clutch plate on said hub adapted to be actuated by said plunger, a cooling fan secured to a bearing which is axially slidable on said hub section between said disc portion and said slidable clutch plate, and fulcrumed levers on said pulley assembly transferring any plunger movement to the movable clutch plate, whereby driving of the cooling fan by the pulley assembly is effected.

8. In a cooling fan drive for an internal combustion engine having a liquid cooling system and a coolant pump, a hollow shaft carrying a plunger therein, a thermostat associated with the liquid cooling system in said pump responsive to temperature changes, said thermostat capable of axially displacing said plunger along said shaft, a one-piece pulley assembly secured to said shaft constantly driven while the engine is in operation, said assembly including a disc portion, a pulley and an axially extending cylindrical hub section, said disc portion functioning as a clutch plate and abutment member, an axially slidable clutch plate on said hub adapted to be actuated by said plunger, a cooling fan secured to a bearing which is axially slidable on said hub section between said disc portion and said slidable clutch plate, fingers pivotally secured to said pulley assembly operatively connecting said plunger and movable clutch plate, whereupon rising temperatures in the liquid cooling system protracts said thermostatically controlled plunger causing the clutch plates to drivingly engage the cooling fan, and spring means for returning the movable clutch plate to a nonengaging position upon retraction of said plunger.

9. In a cooling fan drive for an internal combustion engine having a liquid cooling system and a coolant pump, a hollow shaft carrying a plunger therein, a thermostat associated with the liquid cooling system in said pump responsive to temperature changes, said thermostat capable of axially displacing said plunger along said shaft, a one-piece pulley assembly secured to said shaft constantly driven while the engine is in operation, said assembly including a disc portion, a pulley and an axially extending cylindrical hub section, said disc portion functioning as a clutch plate and abutment member, an axially slidable clutch plate on said hub adapted to be actuated by said plunger, a cooling fan secured to a bearing which is axially slidable on said hub section between said disc portion and said slidable clutch plate, fingers pivotally secured to said pulley assembly operatively connecting said plunger and movable clutch plate, whereupon rising temperatures in the liquid cooling system protracts said thermostatically controlled plunger causing the movable clutch plate to engage the cooling fan and urge it against the disc portion of said pulley assembly, and means for disengaging said fan and disc portion upon retraction of said plunger.

10. In a cooling fan drive for an internal combustion engine having a liquid cooling system and a coolant pump, a hollow shaft carrying a plunger therein, a thermostat associated with the liquid cooling system in said pump responsive to temperature changes, said thermostat capable of axially displacing said plunger along said shaft, a one-piece pulley assembly secured to said shaft constantlly driven while the engine is in operation, said assembly including a disc portion, a pulley and an axially extending cylindrical hub section, said disc portion functioning as a clutch plate and abutment member, an axially slidable clutch plate on said hub adapted to be actuated by said plunger, a cooling fan secured to a bearing which is axially slidable on said hub section between said disc portion and said slidable clutch plate, fingers pivotally secured to said pulley assembly operatively connecting said plunger and movable clutch plate, whereupon rising temperatures in the liquid cooling system protracts said thermostatically controlled plunger causing the movable clutch plate to engage the cooling fan and urge it against the disc portion of said pulley assembly, and means for disengaging said fan and disc portion upon retraction of said plunger, said means comprising a spring washer disposed between said fan and abutment of the disc portion.

11. In a cooling fan drive for an internal combustion engine having a liquid cooling system and a coolant pump, a hollow shaft carrying a plunger therein, a thermostat associated with the liquid cooling system in said pump responsive to temperature changes, said thermostat capable of axially displacing said plunger along said shaft, a one-piece pulley assembly secured to said shaft constantly driven while the engine is in operation, said assembly including a disc portion, a pulley and an axially extending cylindrical hub section, said disc portion functioning as a clutch plate and abutment member, an axially slidable clutch plate on said hub adapted to be actuated by said plunger, a cooling fan secured to a bearing which is axially slidable on said hub section between said disc portion and said slidable clutch plate, fingers pivotally secured to said pulley assembly operatively connecting said plunger and movable clutch plate, whereupon rising temperatures in the liquid cooling system protracts said thermostatically controlled plunger causing the movable clutch plate to engage the cooling fan and urge it against the disc portion of said pulley assembly, and means for disengaging said fan and disc portion upon retraction of said plunger, said means comprising a spring washer disposed between said fan and abutment of the disc portion, said plunger carrying an extensible end member which contacts said pivotal fingers.

12. A cooling fan drive for a liquid cooled apparatus which comprises, a cooling fan associated with a continuously driven pulley assembly but normally remaining stationary relative to said pulley, clutching means carried by said pulley, means for actuating said clutching means, said fan adapted to axially slide on said pulley for engagement with the clutching means, and a spring washer arranged to return said fan to a non-operating position upon disengagement of said clutching means.

References Cited in the file of this patent

UNITED STATES PATENTS

| | | |
|---|---|---|
| 1,433,399 | Modine | Oct. 24, 1922 |
| 2,438,161 | Greenlee | Mar. 23, 1948 |
| 2,658,400 | Dodge | Nov. 10, 1953 |